Jan. 29, 1929.
C. J. BEAVER
1,700,606
TWIN AND MULTICORE ELECTRIC CABLE
Filed Aug. 21, 1926
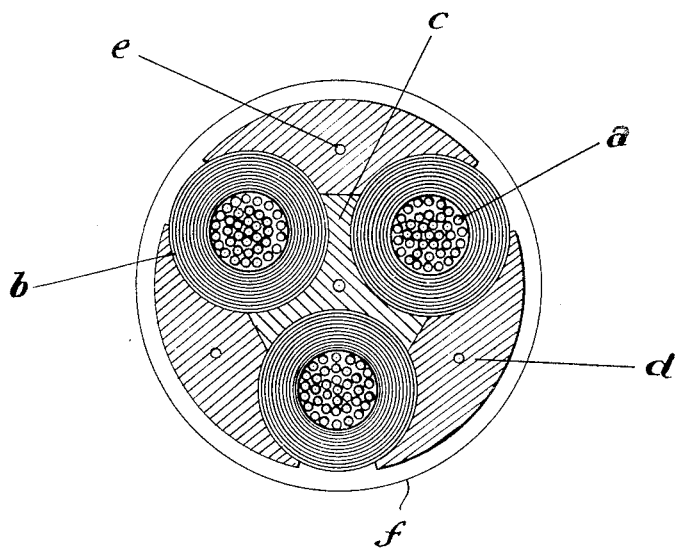
Inventor
Charles James Beaver
By Mason Fenwick Lawrence
Attorneys Patented Jan. 29, 1929.

1,700,606

UNITED STATES PATENT OFFICE.

CHARLES JAMES BEAVER, OF BOWDON, ENGLAND, ASSIGNOR TO W. T. GLOVER AND COMPANY LIMITED, OF MANCHESTER, ENGLAND.

TWIN AND MULTICORE ELECTRIC CABLE.

Application filed August 21, 1926, Serial No. 130,633, and in Great Britain September 4, 1925.

This invention is a new form of twin or multi-core cable.

It is common to construct cables consisting of two or more spirally arranged conductors, each insulated by lappings of paper, fabric, or other like material impregnated with insulating compound, enclosed in an outer circular covering, with the quasi-crescent shaped spaces between the conductors and the outer covering, and (in the case of a cable containing more than two conductors) the central space between the conductors filled with a padding composed of fibrous or hygroscopic material.

In one form of cable heretofore in vogue there is laid up with, and interposed between, the conductors a strip or core of flexible material shaped to conform to the shape of the inner surfaces of the conductors filling the central space between the conductors and projecting for a short distance into the quasi-crescent shaped spaces, the purpose being to form a bed or comparatively wide area to receive each conductor, and so prevent the insulated conductors from impinging together on a mere lineal contact when being laid up, with the incidental risk of a compression, and hence a weakening of the insulating at the very parts where it is subjected to the greatest stress.

In cables of the type referred to, i. e., with the conductors insulated, and the spaces filled as aforesaid, difficulty is experienced in preventing air or gases from being imprisoned in, or moisture penetrating into, the interstices in the fibrous or hygroscopic fillings, and between the fillings and the surfaces of the insulated conductors, and (in the case of a cable furnished with a central strip or more as aforesaid) between the fillings and the surface of the strip, and this difficulty is greater in reference to the crevices around and in the fillings in or near the apices of the crescent shaped spaces, than in the parts thereof more remote from the centre of the cable, and in high tension cables break downs occur consequent on the presence of air or gas or moisture in the crevices referred to. The object of this invention is to construct a cable composed of conductors insulated as aforesaid, in which the fillings are of such a nature, and the method of manufacture such, that the possibility of air gas or moisture being imprisoned, or retained in such crevices as above referred to, is eliminated or reduced.

According to this invention the cable is made with a central strip or core such as described or referred to, and the remainder of the spaces is filled with a padding of vulcanized bitumen or the like, of the desired cross section shape to fill such spaces. I may preferably in order to exclude bubbles or films of air between the component parts when laying them up together, coat the said strips with a viscous material such as petroleum jelly, so that there shall be a surplus of such material to exude when the component parts converge. This process I may assist by compressing all the component parts together by a tight over-lapping of insulating fabric or any other solidifying means which may form part of further lapping of overall insulation in cases where the total insulation is applied partly on the individual conductors and partly after they are laid up together. Further I may make the final convergence of the parts in the laying up while submerged in insulating oil or compound. The central strip or core may be reinforced by a cord or strip of non-conducting material embedded therein, and each of the vulcanized bitumen strips, constituting the fillings, may similarly be reinforced by a cord or strip embedded therein to enable the same to resist the strain incident to the process of laying up.

In the accompanying drawing an example of a cable made according to my invention is illustrated. $a$ are the conductors, $b$ are paper insulations, $c$ is a strip of flexible material interposed between the conductors, and presenting to each insulated conductor a surface corresponding to the desired relative position of, and closely fitting against the surface of each insulated conductor, $d$ are fillings made of strips of vulcanized bitumen or the like, and $e$ are cords or strips of non-conducting material embedded in such filling.

Over all the described component parts is a layer $f$ of fabric additional insulating lappings, or a lead sheathing.

The cable is conveniently constructed by feeding in the strips of material $c$, and the strips of fillings $d$ into the required position in the course of laying up the insulated conductors.

With a cable constructed according to this invention the elimination of air, gases and moisture from the padding itself is assured, and the elimination from the crevices between such filling is facilitated.

What I claim is:—

1. An electric cable, comprising a sheath, a plurality of paper insulated conductors, a core of flexible material, separating the said conductors from each other and shaped to conform to and contact with the same, and filling strips, constituted of non-hygroscopic plastic material located in the several spaces between the core and each pair of conductors and between the sheath and conductors and being shaped to conform to and contact with said core, conductors, and sheath.

2. An electric cable comprising a sheath, a plurality of paper insulated conductors, of circular cross section, a core of flexible material centrally arranged in the said sheath and separating said conductors from each other, said core being formed with arcuate recesses conforming to and seating said conductors; filling strips of nonhygroscopic plastic material located in the several spaces between the core and each pair of conductors and between the conductors and the sheath, said strips being shaped to conform to and make contact with said core, conductors and sheath.

3. An electric cable, comprising a sheath, a plurality of paper-insulated conductors, a core of flexible material centrally arranged in the said sheath and separting the said conductors from each other, said core being shaped to conform to and contact with the said conductors, and filling strips of vulcanized bitumen located in the spaces between the core and each pair of conductors and between the conductors and the sheath, said strips being shaped to conform to and contact with the said core, conductors and sheath.

4. An electric cable, comprising a sheath, a plurality of paper-insulated conductors of circular cross section, a core of flexible material centrally arranged in the said sheath and separating the said conductors from each other, said core being formed with arcuate recesses to seat said conductors, and conforming to and making contact therewith, and filling strips of vulcanized bitumen located in the spaces between the core and conductors and the sheath, said strips being shaped to conform to and contact with, the said core, conductors and sheath.

5. An electric cable, comprising a sheath, a plurality of paper-insulated conductors, a core of material, centrally arranged in said sheath and separating the said conductors from each other, said core being shaped to conform to and contact with the said conductors, filling strips constituted of non-hygroscopic plastic material located in the spaces between the core each pair of conductors and the sheath and being shaped to conform to and contact with the core and with such conductors and the sheath, and a non-conducting re-enforcing cord having greater tensile strength than the core or filling strips and embodied in said core and in each of the said filling strips.

6. An electric cable as set forth in claim 1 in combination with a coating of viscous material around each of the filling strips.

In witness whereof I have signed this specification.

CHARLES JAMES BEAVER.